United States Patent
Mann et al.

(10) Patent No.: US 7,587,965 B2
(45) Date of Patent: Sep. 15, 2009

(54) TOOL HOLDER ASSEMBLY AND METHOD FOR MODULATION-ASSISTED MACHINING

(75) Inventors: James B. Mann, West Lafayette, IN (US); Srinivasan Chandrasekar, West Lafayette, IN (US); Walter Dale Compton, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 195 days.

(21) Appl. No.: 11/381,513

(22) Filed: May 3, 2006

(65) Prior Publication Data
US 2006/0251480 A1      Nov. 9, 2006

Related U.S. Application Data

(60) Provisional application No. 60/677,437, filed on May 3, 2005.

(51) Int. Cl.
*C21D 7/04*     (2006.01)

(52) U.S. Cl. .............................. 82/1.11; 148/1; 408/17; 82/904

(58) Field of Classification Search .................. 82/1.11, 82/118, 123, 133, 134; 148/400, 308; 408/17
See application file for complete search history.

(56) References Cited

U.S. PATENT DOCUMENTS

| | | | | |
|---|---|---|---|---|
| 2,452,211 A | * | 10/1948 | Rosenthal | 451/37 |
| 2,453,136 A | * | 11/1948 | Karweit | 408/17 |
| 2,515,539 A | | 4/1950 | Wichman | |
| 2,514,759 A | * | 7/1950 | Hallden | 74/22 R |
| 2,521,900 A | * | 9/1950 | Clark | 74/22 R |
| 3,003,372 A | * | 10/1961 | Findley | 408/17 |
| 3,015,914 A | * | 1/1962 | Roney | 451/160 |
| 3,028,771 A | * | 4/1962 | Bunnell | 173/199 |
| 3,056,320 A | | 10/1962 | Findley | |
| 3,105,482 A | * | 10/1963 | Mieville | 125/30.01 |
| 3,174,404 A | | 3/1965 | Findley | |
| 3,303,522 A | * | 2/1967 | Kumabe et al. | 408/17 |
| 3,471,724 A | * | 10/1969 | Lewis | 310/26 |
| 3,513,309 A | * | 5/1970 | Hehemann | 250/493.1 |

(Continued)

FOREIGN PATENT DOCUMENTS

DE     2436340     3/1975

(Continued)

*Primary Examiner*—Boyer D Ashley
*Assistant Examiner*—Sara Addisu
(74) *Attorney, Agent, or Firm*—Hartman & Hartman, P.C.; Gary M. Hartman; Domenica N.S. Hartman

(57) ABSTRACT

A tool holder assembly and method for intentionally inducing modulation in a machining process. The tool holder assembly is configured for mounting in a tool block on a machining apparatus and includes a tool holder body configured to be secured to the tool block of the machining apparatus, a tool holder mounted on the tool holder body and configured for securing a cutting tool thereto, and a device for imposing a superimposed modulation on the tool holder so as to move the cutting tool relative to the tool holder body and thereby relative to the tool. The tool holder assembly is useful in a process for producing chips having a desired shape and size, and particularly to a method of controllably producing nanocrystalline chips.

21 Claims, 3 Drawing Sheets

U.S. PATENT DOCUMENTS

| | | | |
|---|---|---|---|
| 3,559,259 A | | 2/1971 | Kumabe |
| 3,619,671 A | * | 11/1971 | Shoh .......................... 310/325 |
| 3,713,045 A | * | 1/1973 | Usuda et al. ................. 331/109 |
| 4,640,156 A | | 2/1987 | Nakagawa et al. |
| 4,646,595 A | * | 3/1987 | Slee ............................ 82/118 |
| 4,667,546 A | | 5/1987 | Dombrowski et al. |
| 4,911,044 A | | 3/1990 | Mishiro et al. |
| 5,113,728 A | * | 5/1992 | Medeksza .................. 82/1.11 |
| 5,291,812 A | * | 3/1994 | Yen et al. ..................... 82/134 |
| 5,331,870 A | * | 7/1994 | Chin-Long ................. 82/1.11 |
| 5,342,152 A | | 8/1994 | Medeksza |
| 5,778,745 A | * | 7/1998 | Furusawa et al. ............ 82/1.11 |
| 5,911,802 A | * | 6/1999 | Kimura et al. ............... 82/1.11 |
| 6,084,363 A | * | 7/2000 | Mizumoto ................... 318/116 |
| 6,202,521 B1 | | 3/2001 | Rossetti et al. |
| 6,234,728 B1 | | 5/2001 | Brun-Picard et al. |
| 6,465,931 B2 | * | 10/2002 | Knowles et al. ........ 310/316.01 |
| 6,706,324 B2 | | 3/2004 | Chandrasekar et al. |
| 6,925,915 B1 | * | 8/2005 | Claesson et al. .............. 82/133 |
| 7,131,797 B2 | | 11/2006 | Kai et al. |
| 7,216,571 B2 | * | 5/2007 | Schreiber et al. ............. 82/1.11 |
| 2002/0150496 A1 | * | 10/2002 | Chandrasekar et al. ........ 419/33 |
| 2005/0167008 A1 | * | 8/2005 | Chandrasekar et al. ...... 148/400 |
| 2006/0248980 A1 | * | 11/2006 | Mann et al. .................... 75/246 |
| 2006/0251480 A1 | * | 11/2006 | Mann et al. .................. 408/1 R |

FOREIGN PATENT DOCUMENTS

| | | |
|---|---|---|
| DE | 9212079 | 12/1992 |
| DE | 10343682 | 4/2005 |
| JP | 7164217 | 6/1995 |
| JP | 2002126902 | 5/2002 |
| WO | WO03061886 | 7/2003 |
| WO | WO2006002675 | 1/2006 |

* cited by examiner

α – Rake angle
∅ – Shear plane angle
γ – Clearance angle
$t_o$ – Undeformed chip thickness
$t_c$ – Deformed chip thickness
$V_c$ – Cutting velocity

TOOL HOLDER ASSEMBLY AND METHOD FOR MODULATION-ASSISTED MACHINING

CROSS REFERENCE TO RELATED APPLICATIONS

This patent application claims the benefit of U.S. Provisional Application No. 60/677,437, filed May 3, 2005, the contents of which are incorporated herein by reference.

BACKGROUND OF THE INVENTION

The present invention generally relates to machining equipment, and more particularly to a tool holder assembly capable of providing controlled modulation (e.g., forced displacement) of a cutting tool during a machining process, such as for the purpose of producing chips having nanocrystalline microstructures and desirable sizes and shapes.

Developments in cutting tool technology have been generally directed to the use of advanced materials and coatings, unique geometries, and combinations thereof to improve tool life, reduce cutting forces, and reduce machining effluent streams. Geometric chip breaker features on cutting tools have been introduced specifically to promote chip breakage, though generally without the capability of creating separation between the tool and workpiece interface or controlling the size of the machine chips. Chip breakage during drilling has also been achieved through modulation, in which the drill bit is axially displaced in a cyclical manner. In addition to achieving chip breakage, modulation-assisted drilling has also been demonstrated to improve drilling performance and reduce the need for cutting fluids. For example, modulation-assisted deep hole drilling (hole aspect ratios with length to diameter (L/D) ratios of up to twenty) with minimal lubrication has been demonstrated. Such findings have been expanded to demonstrate that modulation can improve the lubrication effectiveness on metal cuttings. Such areas of research can be extended to enhance machining performance and reduce machining effluents through process control and innovation with positive impact on energy consumption and ecology.

Aside from the above, current state-of-the art machining practices do not consider modulation as a desirable parameter. The aforementioned research has generally been carried out using specialized equipment specifically designed and assembled for applying modulation in machining processes, and economic barriers exist with respect to capital cost of the technology in machine design or industry application. As such, general machining process design emphasizes the elimination or reduction of vibrations, which are commonly associated with instabilities that are detrimental to the performance of the machining process.

BRIEF SUMMARY OF THE INVENTION

The present invention provides a tool holder assembly and method for intentionally inducing modulation in a machining process. According to a preferred aspect of the invention, the tool holder assembly is useful in a process for producing chips having nanocrystalline microstructures, and particularly to a method of controllably producing nanocrystalline chips with a desired shape and size.

The tool holder assembly of this invention is configured for mounting in a tool block on a machining apparatus. The tool holder assembly includes a tool holder body configured to be secured to the tool block of the machining apparatus, a tool holder mounted on the tool holder body and configured for securing a cutting tool thereto, and means for imposing a superimposed modulation on the tool holder so as to move the cutting tool relative to the tool holder body and thereby relative to the tool block of the machining apparatus.

The tool holder assembly of this invention is particularly suited for use in a method intended to machine a body with a cutting tool to produce chips having a desired size and shape. In particular, the tool holder assembly is adapted to impose a superimposed modulation on the cutting tool so as to move the cutting tool relative to the body being machined and cause instantaneous and periodic separation between the cutting tool and the body at a point of contact between the cutting tool and the body, wherein each separation between the cutting tool and the body yields a chip. In this manner, the shapes and sizes of the chips are determined at least in part by the modulation cycle, and particularly the length of time the cutting tool is engaged with the body being machined. According to a preferred aspect of the invention, the body is machined in a manner that produces chips that consist essentially of nanocrystalline microstructures as a result of the machining operation being performed in a manner that imposes a sufficiently large strain deformation. The body can be formed of a variety of materials, including metals, metal alloys, intermetallics, and ceramic materials. Furthermore, the body may have a microstructure that is essentially free of nano-crystals, and may even have a single-crystal microstructure. The chips produced by the machining operation may be in the form of particulates, ribbons, wires, filaments and/or platelets.

Chips produced in the above manner may be consolidated (with or without comminution) to form a product, such that the product is essentially a nanocrystalline monolithic material consisting essentially or entirely of nano-crystals, or of grains grown from nano-crystals. Alternatively, the chips may be dispersed in a matrix material, such that the product is a composite material in which the chips are dispersed as a reinforcement material.

The preferred usage of the tool holder assembly of this invention is based on the determination that nanocrystalline structures can be formed in materials by machining under appropriate conditions to produce very large strain deformation, including high strain rates, such as a plastic strain of about 0.5 to about 10 and a strain rate of up to $10^6$ per second. Machining processes believed to be capable of producing suitable nanocrystalline structures include cutting and abrasion techniques. Cutting speed does not appear to be determinative, such that essentially any cutting speed can be used if a cutting tool is used to perform the machining operation. Because the production method for the chips is a machining operation whose parameters can be precisely controlled, the desired nanocrystalline microstructure for the chips can be accurately and repeatably obtained for a given material. The modulation-assisted capability provided by the tool holder assembly of this invention further enables the controlled production of nanocrystalline chips of desirable macroscopic sizes and shapes for use in a variety of applications. Furthermore, the tool holder assembly can be used to produce nanocrystalline solids from materials that are difficult or impossible to process using prior art techniques, such as very hard materials that cannot be processed by multistage deformation processes and alloys that cannot be processed by the condensation method.

In view of the above, the tool holder assembly of this invention finds utility in controllable and low-cost methods for synthesizing chips and particularly nanocrystalline solids that can be used in the production of a variety of monolithic and composite products.

Other objects and advantages of this invention will be better appreciated from the following detailed description.

DETAILED DESCRIPTION OF THE INVENTION

As will be discussed below, the present invention is a tool holder assembly that is particularly useful in view of research that demonstrated the benefits of superimposed modulation on machining processes. In particular, commonly-assigned and copending U.S. patent application Ser. No. 11/381,392 discloses that a modulation motion imparted to a cutting tool or workpiece during a machining process can create an instantaneous separation between the tool and the material at the intimate region of tool-chip contact. Depending on the direction of the applied modulation, effective chip formation is realized, with secondary benefits being improved cutting performance and improved effectiveness of lubrication by cutting fluids. Effective chip formation can be used to control the size of the machined chip, with important implications on chip management or process applications where chip size and shape are relevant.

Figure 4:
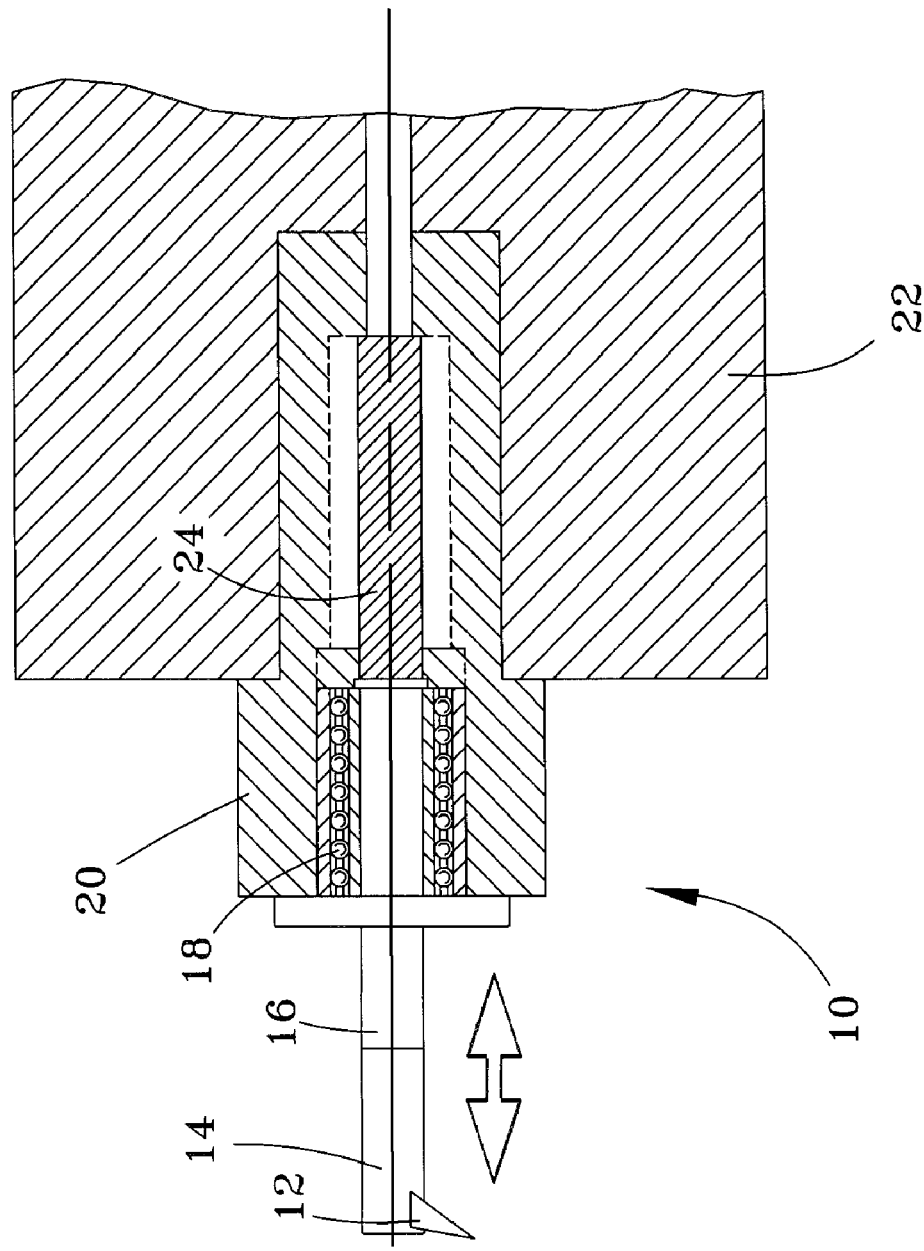
FIG. 4 represents a tool holder assembly for use in a modulation-assisted machining technique of this invention.

A tool holder assembly 10 within the scope of this invention represented in FIG. 4. The assembly 10 is adapted for use in a potentially cost-effective method for introducing and commercializing modulation in traditional and state-of-the art machining processes through the application of modulation directly to a cutting tool 12. The tool holder assembly 10 as shown is capable of use in modulation-assisted turning and drilling operations. As such, while the cutting tool 12 is represented as a cutting insert, the cutting tool 12 could alternatively be a drill tool or cut-off/parting tool. The tool holder assembly 10 is also applicable to a variety of other machining processes, such that existing and future machine tools and processes could be fitted or retrofitted with the tool holder assembly 10 for applying modulation in machining. The cutting tool 12 is shown as being mounted with a tool holder 14 directly to a linear ball spline shaft 16, though it should be understood that the tool 12 could be or incorporated directly in the design of the linear ball spline shaft 16, such that the ball spline shaft 16 is an integral component of the tool holder 14. The ball spline shaft 16 is supported by a ball spline bearing 18 is assembled into a tool holder body 20, and the entire assembly is mounted on a machine tool block 22. The tool 12 could be used in a conventional manner, though according to the invention, the tool holder assembly 10 is adapted to locally apply modulation to the tool 12. For this purpose, the tool holder assembly 10 includes a linear actuator 24, for example, piezo mechanical linear translators, a magnetostrictive linear actuator, linear drive motor, etc., within the tool holder body 20 and coupled to the ball spline bearing 18 mounted on the ball spline shaft 16. The actuator 24 imposes linear modulation on the tool 12. The bearing 18 transfers out-of-plane forces into the tool holder body 20, preventing torsion or bending at the linkage of the actuator 24 and the ball-spline shaft 16.

In the assembly 10 shown, the tool 12 is modulated axially. Depending on the machine tool design, the tool 12 could be mounted parallel to the workpiece rotational axis (e.g., cylindrical turning or drilling) or transverse to the workpiece rotational axis (e.g., cut-off, transverse turning). However, this same approach could be extended to modulation in alternative tool directions. In addition, the proposed invention could be implemented in rotating tools (e.g., machining centers, live drills) with adaptation of actuator mechanisms capable of interfacing with the rotary tool.

Depending on the direction of the applied modulation during the machining operation, two distinct effective conditions develop. With applied modulation in the tool feed direction, the uncut chip thickness equals zero (h=0) during each cycle of modulation effectively breaking the chip. These conditions occur when the peak-to-peak amplitude of modulation is greater than the tool feedrate and the frequency of modulation is properly controlled, namely, the modulation frequency and workpiece rotational frequency meet sufficient conditions. For applied modulation in the direction of cutting velocity, the conditions for separation between the tool and chip interface develop at zero cutting velocity, requiring the product of modulation frequency and amplitude to exceed the local tangential velocity of the workpiece. In both directional cases of applied modulation, the separation at the tool and workpiece interface increases the effectiveness of lubrication during machining. However, for the case of modulation in the direction of feed velocity, the chip formation and shape can be controlled. Also, in both cases the effects of system compliance will determine the physical threshold for the conditions of separation at the tool-chip interface.

Piezo-mechanical and magnetostrictive translator/actuator technologies are capable of delivering the required modulation forces and frequency response in the range of lathe machining conditions considered. Lead zirconate tantonate (PZT) based piezo-mechanical translators typically operate in a relatively lower frequency range (e.g., about 5 kHz) with higher amplitude capability (e.g., about 0.150 mm), in comparison to terfenol-D based magnetostrictive actuators with higher frequency ranges (e.g., about 30 kHz) at lower amplitudes (e.g., about 0.005 mm). In general, both types of technologies are capable of meeting requirements for general machining conditions. However, it is foreseeable that the specific machining process or desired modulation direction may require one type of actuator technology over another. For modulation in the direction of tool feed velocity, higher amplitude actuators (such as piezo translators) are likely more appropriate, while modulation in the direction of cutting velocity allows for the use of higher frequency actuators (such as magnetostrictive-based). However, since both of these actuator technologies are intolerant of applied torsion or bending loads, the tool holder assembly 10 is shown as including a mechanical linkage (the linear ball spline bearing 18) to decouple these loads from the actuator 24. In addition to piezomechanical and magnetostrictive actuators, continued developments in linear motor technology are expected to offer the capability to apply motion control, providing an additional route to locally modulating the cutting tool 12.

The local modulation of the cutting tool 12 eliminates undesirable inertial effects caused by modulation of large machine masses (such as the tool block 20), and avoids the capital cost required for modulation in the base machine design, offering the machining industry a cost effective route to adopting modulation machining technology. As such, a distinct advantage of the tool holder assembly 10 is the relatively small mass being modulated, as compared to the mass of various other machine tool elements (such as machine slideways, drives, turrets, work-holding mechanisms, etc.). By applying the modulation locally at the cutting tool 12, the undesirable dynamic forces caused by inertia of larger machine element masses is avoided. Furthermore, the tool holder assembly 10 is significantly lower in cost compared to the capital investment required for modulation in the base machine design, offering manufacturing industries a relatively inexpensive route to adopting the technology into mainstream machining operations. Thus, new or existing machine tools and processes can be fitted or retrofitted with the tool holder assembly 10 for modulation-assisted machining.

Other technologies are available to incorporate modulation capacity in the fundamental design of state-of-the-art machine tool systems. These include recent advances in linear drive technology or high speed machine tool slide elements. Currently, the application of linear drives in machine tools is a consequence of increasing demand for speed, precision, and repeatability. However, emphasis has not been placed on exploiting the related inherent modulation capacity. Etrema Products, Inc. (Ames, Iowa, USA) currently markets Active Machining Systems (AMS) based on magnetostrictive actuator technology in lathe machining applications to create barrel shaping while turning. This system could potentially be modified for modulation-assisted machining. However, the size of the device limits the potential machine applications. Similarly, Polytec PI, Inc. (Physik Instrumente, Auburn, Mass., USA) designs and markets custom fast tool servo slides for lathe machining applications using piezoelectric translator technology for increased slide velocity or an alternative to servo-motor mechanisms. While both of the commercial tool slide systems mentioned could potentially be modified to apply modulation during the machining process, they are limited by higher cost and custom design requirements.

A particularly preferred aspect of the invention is the suitability of the tool holder assembly 10 for use in a method to directly produce nanocrystalline chips by modulated machining. Such nanocrystalline chips can be directly manufactured from bulk materials, including metals, metal alloys, intermetallics, and ceramics. The assembly 10 is particularly believed to be well suited for use in deep hole drilling operations, especially in difficult-to-machine metals and alloys including stainless steels, precipitation hardening steels, titanium, and tantalum materials. The bulk materials machined using the assembly 10 may have microstructures that are essentially free of nanocrystals. The machining conditions are chosen to induce severe plastic deformation that results in the creation of chips with nanocrystalline microstructures, while modulation conditions are superimposed on the machining operation through the tool holder assembly 10 to control the size and shape of the nanocrystalline chips, providing the capability of chips ranging from a few nanometers to several millimeters in length. Because nanocrystalline chips of controllable morphology, size, and shape can be produced directly by the modulated machining process of this invention, the need for additional secondary comminution steps is eliminated. With controlled modulation, it is possible to produce nanocrystalline chips with sizes and shape that include equi-axial particulates, ribbons, wires, filaments, and platelets. Consequently, the term "chip" is used herein to encompass essentially any form that can be produced by a machining operation.

Commonly-assigned U.S. Pat. No. 6,706,324 discloses machining techniques for the large scale production of nanocrystalline materials based on the determination that high strain deformation during chip formation in machining leads to significant grain refinement and development of nanocrystalline microstructure in metals and alloys. The deformation that occurs in the shear plane of a chip can be seen in reference to FIG. 1, which represents the machining of a workpiece surface with a wedge-shaped indenter (tool). The material being removed by large strain deformation, namely, the chip, slides over the surface of the tool known as the rake face. The angle between the rake face of the tool and the normal to the work surface is known as the rake angle ($\alpha$). The edge of the wedge penetrating the workpiece is the cutting edge. The amount of interference between the tool and the workpiece is the undeformed chip thickness depth of cut ($t_o$) and the relative velocity between the tool and the workpiece is the cutting velocity ($V_c$). When the tool cutting edge is perpendicular to the cutting velocity and the width of cut is small compared to the cutting edge length and $t_o$, a state of plane strain deformation prevails, which is believed to be a preferred configuration for experimental and theoretical investigations of machining.

Figure 1:
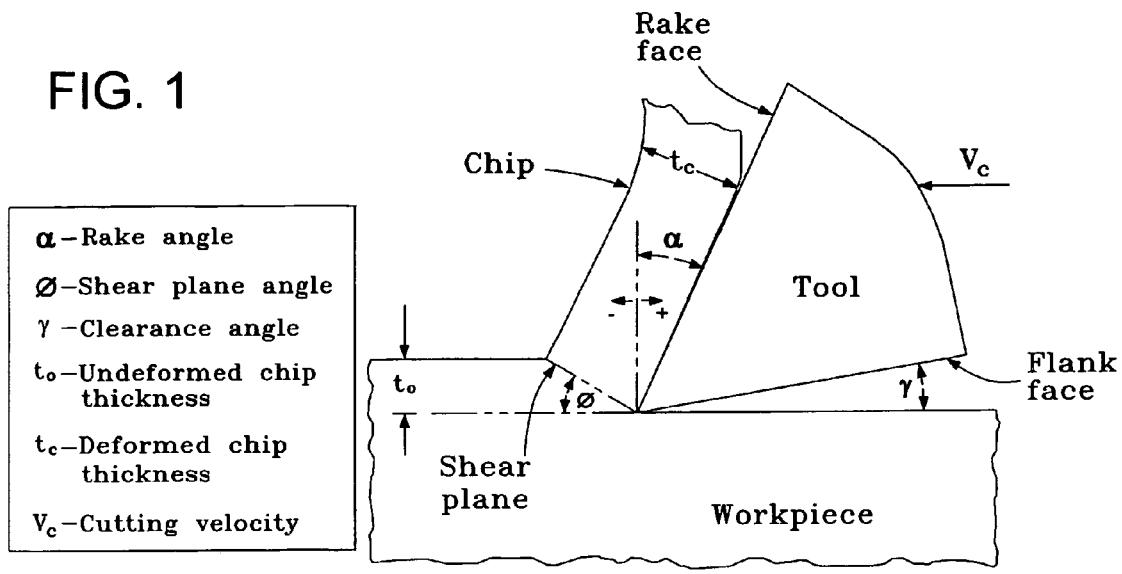
FIG. 1 schematically represents the process of machining a body with a cutting tool to produce chips in accordance with an embodiment of this invention.
Figure 1:
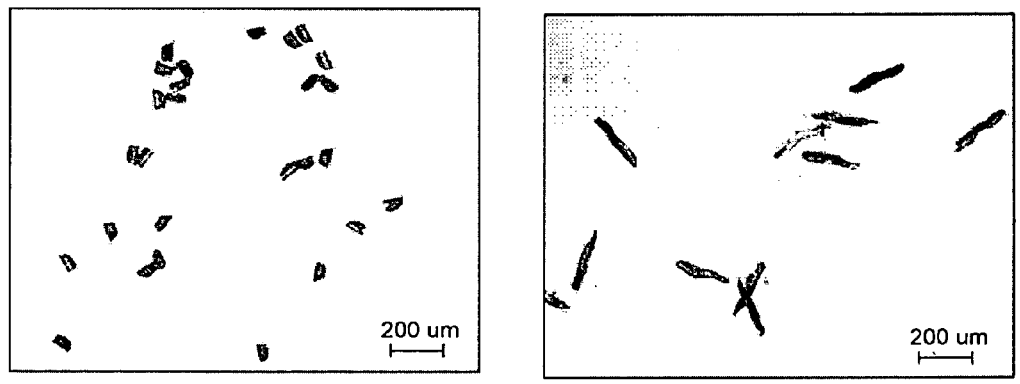

The chip formation in FIG. 1 is seen to occur by concentrated shear along a plane called the shear plane, where a shear strain ($\gamma$) is imposed during chip formation. The shear strain can be estimated by Equation (1) below:

$$\gamma = \cos \alpha / \sin \phi \cos(\phi - \alpha) \quad \text{(Eq. 1)}$$

where the shear plane angle ($\phi$) is a known function of $t_o$ and $t_c$. The effective Von Mises strain ($\epsilon$) can be predicted using $$\epsilon = \gamma/(3)^{1/2} \quad \text{(Eq. 2)}$$

Equation (1) shows that the shear strain ($\gamma$) can be varied over a wide range by varying the rake angle ($\alpha$) from large positive to large negative values (see FIG. 1). Additionally, the friction at the tool-chip interface also affects shear strain ($\gamma$) via its effect on the shear plane angle $\phi$.

In view of the above, and as reported in the literature, effective plastic strains in the range about 0.5 to about 10 and strain rates of up to $10^6$ per second can be generated with appropriate machining conditions, as can a wide range of shear plane temperatures. These ranges of values are substantially greater than can be realized in typical severe plastic deformation processes. Geometric parameters of machining like depth of cut ($t_o$) rake angle ($\alpha$) and cutting velocity ($V_c$) affect the shear deformation in a manner analogous to the action of dies in forging or extrusion. The effective plastic strain along the shear plane (deformation zone) in the chip can be systematically varied in the range of about 0.5 to about 10 by changing the tool rake angle, and to a lesser extent by changing the friction between tool and chip. The mean shear and normal stresses on the shear plane can be varied by changing the tool geometric parameters together with process parameters such as $V_c$ and $t_o$, while the values of these stresses can be obtained from measurement of the forces. Finally, the temperature in the deformation zone can be systematically varied by changing the cutting velocity. For example, by cutting at very low velocities (about 0.5 mm/s), the temperature can be kept marginally above the ambient temperature while achieving very large strain deformation. Alternatively, temperatures where phase transformations (e.g., martensitic, melting) may be expected to occur in the chip can be realized by increasing the cutting velocity to higher values, for example, about 1 to about 2 m/s. The ability to change the friction along the tool-chip interface by a factor of up to three has also been demonstrated using a combination of tool coatings, low-frequency modulation of the tool-chip interface, and lubrication which assures that lubricant is always present at the interface between the tool and the chip. The extent to which friction (as well as the other parameters and conditions discussed above) can be controlled in a machining operation is not possible in other severe plastic deformation processes. In summary, the temperature, stress, strain, strain rate and velocity fields in the zone of deformation can be well estimated using available mechanics models or obtained by direct measurement. Thus, very large strain deformation conditions can be imposed and varied systematically over a wide range, a range over and beyond that currently obtainable in other severe plastic deformation processes.

From the above, it can be appreciated that U.S. Pat. No. 6,706,324 provides a basis for production of nanocrystalline structures in a wide group of materials and at lower costs compared to other processes. While U.S. Pat. No. 6,706,324 discloses that chips can be produced to have a desirable shape and size through secondary comminution (e.g., ball, attrition, jet milling, etc.), the modulation technique employing the tool holder assembly 10 of this invention can be used to produce chips of desirable shapes and sizes directly through the machining process. More particularly, if appropriate conditions of modulation are applied through the tool holder assembly 10 in the tool feed direction during machining, then the uncut chip thickness equals zero during each cycle of modulation, effectively breaking the chip. As noted above, these conditions occur when the peak-to-peak amplitude of modulation is greater than the tool feedrate and the frequency of modulation is properly controlled, namely, the modulation frequency and workpiece rotational frequency meet sufficient conditions. As such, by combining the production of nanocrystalline materials by machining with suitable modulation techniques, nanocrystalline chips of specific sizes and shapes can be produced. In contrast, secondary comminution processes offer only limited or no controllability of the final size and shape of the chips. Accordingly, the production of nanocrystalline chips via modulation-assisted machining in accordance with this invention offers notable advantages in production process control and capability.

Figure 2:
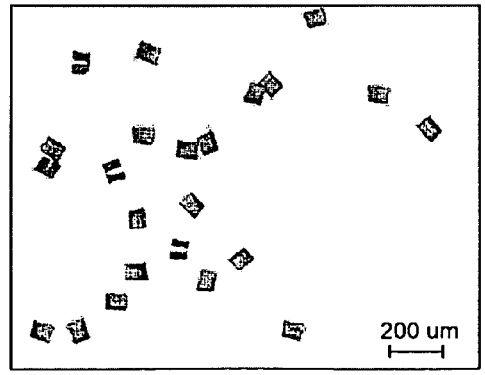
FIGS. 2 and 3 are scanned images of nanocrystalline chips produced by modulation-assisted machining techniques of this invention.
Figure 3:
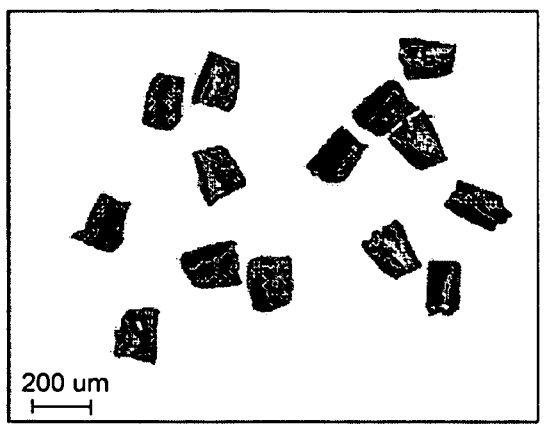
Figure 3:
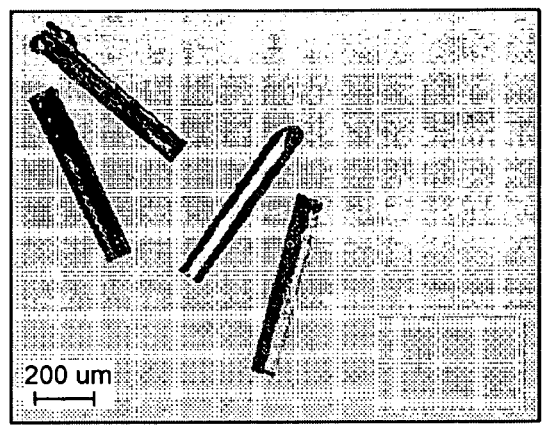
Figure 3:
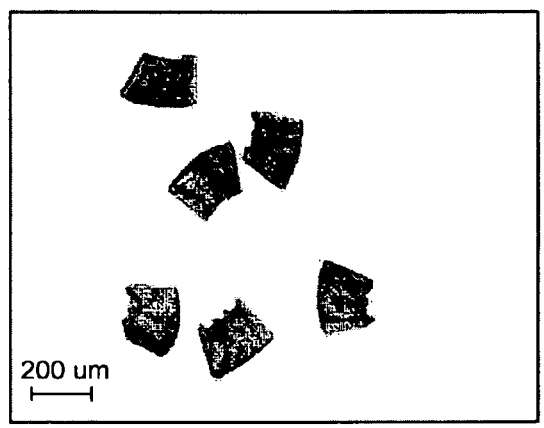

As an example of the above, FIGS. 2 and 3 are photomicrographs of 6061-T6 nanocrystalline aluminum chips produced with a 0 (zero) degree rake angle tool in an orthogonal modulation-assisted turning operation. The chips generally have equiaxed grains with a typical grain size of about 75 nm. The particulates in FIG. 2 are substantially identical in volume (about $6.25 \times 10^{-5}$ mm$^3$), though in different shapes, including equiaxed, needle, and platelet. The particulates in FIG. 3 are also identical volume particles (about $168.8 \times 10^{-5}$ mm$^3$), again in different shapes including equiaxed, needle, and platelet. These particles were produced using different size diameter bars in a cylindrical turning operation. The workpiece rotational speed, depth-of-cut, and modulation frequency and amplitude were varied based on the mathematical model for the modulation-assisted machining process. As a result of the grain refinement achieved during machining, the chips exhibited hardness of about 150 HV, which was up to 50% harder than the original bulk stock. Such nanocrystalline chips can be consolidated into components or structures through powder metallurgy (PM) processes or serve as important constituents in metal and polymer matrix composites.

Modulation-assisted machining of nanocrystalline chip can be scaled from low-volume experimental demands to high-volume industrial demands by the same fundamental approach. For example, in the production of chips in particulate form, increased production rates can be accomplished by increased material removal rates complemented by increased modulation frequency limited by dynamic response, and the use of multiple edge cutting tools designed to proportionally increase chip production rate.

The basis for the modulation-assisting machining process of this invention will now be described in greater detail in reference to a cylindrical orthogonal turning operation, in which the cutting tool travels parallel to the axis of the workpiece being machined (coinciding with the axis of the turning spindle) to remove a layer of material from the circumference of the workpiece. Those skilled in the art will appreciate that the application of modulation in transverse facing and cut-off turning operations, as well as other machining processes (e.g., drilling, milling, grinding, etc.), would follow a similar approach.

In the present example, the cutting velocity, $v_c$, is defined by the workpiece diameter and rotational speed according to the following equation:

$$v_c = 2\pi r f_w$$

Tool position, $z_o$, of the cutting tool at a given time t in the steady state is $$z_o = v_f t$$

where $v_f$ is feed velocity without modulation (e.g., mm/sec), and t is time (in seconds). The axial feed velocity, $v_f$, of the tool during cylindrical turning is defined by the feedrate, a, according to the following equation:

$$v_f = a f_w$$

where $v_f$ is the feed velocity without modulation (e.g., mm/min), a is the axial feedrate per revolution (e.g., mm/rev), and $f_w$ is the workpiece rotation frequency (rotations/second). The uncut chip thickness, h, at any time, t, is a constant function of the feedrate and the number of cutting edges of the tool used. For a tool with "n" cutting edges, the expression is h(t)=a/n=constant.

While modulation can be a general function of time, a forced harmonic modulation in the direction of feed velocity is considered for the approach of the present example, and $f_m$ is the frequency of the modulation in cycles/second (Hz). In a first example, in which a sinusoidal modulation $z(t) = A \sin(2\pi f_m t)$ is applied to the tool in the direction of feed velocity, the tool position varies periodically with time and the uncut chip thickness is a function of time. Based on earlier reports, at any time, t, the tool position is the difference between the instantaneous position of the tool z(t) and the relative position of the tool in the previous cycle z(t−T) (where T is the period of one cycle defined by workpiece rotation). Then, the instantaneous uncut chip thickness, h, is defined as $$h(t) = z_0 + z(t) - z(t-T)$$

For sinusoidal modulation, the general form of uncut chip thickness as a function of time and the number of tool cutting edges, n, is $$h(t) = z_0/n + z(t) - z(t-T/n)$$

$$h(t) = v_f T/n + 2A\{\cos[\pi f_m(2t-T/n)]\sin[\pi(f_m/n)T]\}$$

$$h(t) = a/n + 2A[\cos(2\pi f_m t - \pi(f_m/n)/f_w)][\sin(\pi(f_m/n)/f_w)]$$

where $f_w$ is the workpiece rotational speed (rotations/sec), T is the period of one revolution of the workpiece=$2\pi/\omega_w = 1/f_w$, n is the number of cutting tool edges, $v_f$ is the feed velocity without modulation (mm/sec), m is the frequency of the modulation in cycles/sec (Hz) ($\omega_m = 2\pi f_m$ rad/sec), A is one-half of the peak-to-peak amplitude of modulation (mm), and t is time (sec).

The formation of individual particles occurs when the uncut chip thickness (h) reaches a value of h=0 during each cycle of modulation. The values of time for h=0 are solved numerically. From the functional relationship of uncut chip thickness, the ratio of the modulation frequency and number of cutting edges to the workpiece rotational frequency $(f_m/n)/f_w$, must not be zero or an even integer, as even integer multiples of n in the expression for h(t) yield a constant value of $h(t)=v_f T=v_f/f_w$ (these conditions would imply no effect of modulation on uncut chip thickness; the relative change in the tool position per cycle, and subsequent cuts at time t follow the same path as the cut in the previous cycle t−T). In the case of cylindrical orthogonal turning, the number of cutting edges (n) is one (single point turning), and a sufficient condition for zero chip thickness is that the amplitude of modulation 2A is greater than or equal to "a" which is greater than or equal to $v_f/f_w$, and the ratio $f_m/f_w$ must be an odd integer multiple of ½. While these conditions are a mathematically sufficient condition to cause separation between the tool-chip interface at the intimate region of contact, the physical effects of system compliance (e.g., tool stiffness, workpiece stiffness) will increase the actual magnitude of amplitude 2A required to achieve h=0 and effectively break the chip. Furthermore, it is important to note that ratios of $f_m/f_w$ in the set of real values can lead to the formation of individual chip particles, depending on the value of the amplitude 2A.

From the numerical solutions of time values for h=0, it is possible to determine the characteristics of the chip formation frequency and the absolute chip length. These time-based attributes of chip formation are related to the modulation amplitude, modulation frequency, and the workpiece rotational frequency, but a unique expression is not tractable. However, the time duration of cutting with modulation can be determined from the numerical solutions of sequential time values where h=0. Control of the chip by modulation-assisted machining can significantly influence material handling in machining chip management or play an important role in applications where the size and/or shape of the chip is relevant. In general, for a given set of cutting conditions, the chip formation frequency is proportional to the ratio of the modulation frequency to the workpiece rotational frequency. Then, the number of chips broken per cycle of workpiece revolution is given by $$f_{CB} = f_m/f_w$$

where $f_{CB}$ is the frequency of broken chips per workpiece revolution (breaks/rev). The chip length can be decreased by decreasing the workpiece rotational speed or increasing the modulation frequency. Since the total rate of volumetric material removal is unchanged by modulation, the volume removed per cycle of modulation can be used to evaluate the shape of the chip. An approximate length, L, of the chip can be estimated from the duration of time that cutting takes place in each cycle of modulation and the relative cutting velocity. The actual shape (and length) of the chip results from a complex relationship between the actual path distance of tool penetration during modulation and the effects of the strain due to cutting.

$$L \approx 2\pi r f_w T_{CB}$$

where r is the radius of the workpiece (e.g. mm). $T_{CB}$ is the cutting duration for one cycle of modulation (numerical solution time values where h=0), L is the approximate chip length (mm), and $f_w$ is the workpiece rotational frequency (rotations/sec).

The actual length of the chip will depend on the penetration of the tool into the workpiece caused by the modulation amplitude and frequency conditions. It is important to note that in the mathematical model that the chip length can be controlled directly by modifying the modulation conditions, and that essentially any length of chip can be obtained within the limits of the workpiece geometry.

In machining operations in which a sinusoidal modulation $z(t)=A \sin(2\pi f_m t)$ is to be applied to the tool in the direction of cutting velocity, the instantaneous uncut chip thickness, h, remains a constant function of the prescribed tool feed velocity $h=z_o=v_f t=a=$prescribed constant. While the uncut chip thickness is unchanged, the instantaneous tool position and the cutting velocity, $v_c$, changes periodically with time. The relative circumferential position of the tool to the workpiece under steady-state conditions without modulation is given by $$c(t) = 2\pi r_f t$$

where r is the radius of the workpiece (e.g., mm). With applied modulation in the direction of the cutting velocity, the resulting cutting velocity with modulation ($V_{cm}$, mm/sec) is $$V_{cm} = 2\pi r f_w + 2\pi f_m A \cos(2\pi f_m t)$$

$$V_{cm} = v_c + 2\pi f_m A \cos(2\pi f_m t)$$

where $v_c$ is the cutting velocity without modulation (mm/sec), $f_m$ is the frequency of the modulation (cycles/sec, Hz), $f_w$ is the workpiece rotational frequency (rotations/sec, Hz), A is one-half the peak-to-peak amplitude of modulation (mm), and t is time (sec).

If the product of $f_m A$ is greater than or equal to $v_c/2\pi$, (alternatively, $f_m A$ is greater than or equal to $rf_w$), then the instantaneous cutting velocity $v_{cm}$ is 0 or less during each cycle of modulation, initiating the necessary conditions for separation at the tool-chip intimate region of contact. The instantaneous separation increases the effectiveness of lubrication during the machining process by allowing the lubricant to penetrate the region of the tool-chip interface, improving cutting performance. The condition that $f_m A$ is greater than or equal to $v_c/2\pi$ is a sufficient condition to cause separation between the tool-chip interface at the intimate region of contact. However, as in the case of modulation in the direction of feed velocity, the magnitude of $f_m A$ required to achieve a cutting velocity $v_{cm}$ of 0 or less is slightly greater than $v_c/2\pi$ to compensate for machining system compliance (e.g., tool stiffness, workpiece stiffness, etc.).

With typical lathe cylindrical turning conditions including a feed rate, a, of about 0.150 mm/rev and workpiece rotational frequency, $f_w$, of about 2500 rpm, the feed velocity without modulation, $v_f$=0.150 mm×2500 rpm/(60 sec/mm)=6.25 mm/sec. For applied modulation in the direction of feed velocity, an amplitude of modulation $2A \geq a \geq 0.150$ mm (h=0) is necessary to effectively break the chip. Under the same cutting conditions, and assuming a workpiece radius (r) of 8.8 mm, for modulation applied in the direction of cutting velocity to become effective, $\omega_m A \geq v_c/2\pi$, $\omega_m A$>about 367 and a prescribed modulation amplitude of 2A=0.010 mm must occur with a frequency $f_m$ of about 11.6 kHz to initiate the conditions for separation between the tool and chip contact ($v_{cm}$ is 0 or less). It is important to note the relative differences in the direction and the relative components of the modulation conditions that result in chip formation or separation.

In view of the above, the tool holder assembly 10 of the present invention can be seen to overcome various shortcomings of existing equipment adapted for modulation-assisted machining. By utilizing actuator technologies such as magnetostrictive or piezo mechanical actuators with linear ball-spline bearings, the tool holder assembly 10 provides a mechanical interface to apply forced displacement at a cutting tool in a manner that enables the size and shape of a chip to be controlled. The linear ball spline bearing decouples the torsion loads from the actuator, carrying out-of-plane applied loads while allowing nearly frictionless movement in the modulation direction. Because modulation is applied locally at the cutting tool and the components directly supporting the tool, potentially undesirable dynamic effects caused by modulation of large machine element masses are avoided. The tool holder assembly 10 provides a relatively inexpensive route to adopt modulation technology into mainstream machining processes such as turning and drilling, and avoids the capital cost required for modulation in the base machine design or custom retrofitted machine elements. Existing machine tools and processes can be retrofitted with the tool holder assembly 10, whereas other alternatives require significantly higher cost and custom designed machine elements. The tool holder assembly 10 also offers the potential for reduced energy requirements in machining by allowing more effective lubrication and improving machining performance. Increasing lubrication effectiveness by local separation of the tool-chip interface can potentially reduce machining effluent streams (e.g., water and/or chemical based) with a potentially positive impact on the ecology of machining operations.

While the invention has been described in terms of particular embodiments, it is apparent that other forms could be adopted by one skilled in the art. Accordingly, the scope of the invention is to be limited only by the following claims.

The invention claimed is:

1. A tool holder assembly configured for mounting in a tool block on a machining apparatus, the tool holder assembly comprising:
    a tool holder body configured to be secured to the tool block of the machining apparatus;
    a tool holder mounted on the tool holder body and configured for securing a cutting tool thereto;
    means for imposing a superimposed sinusoidal modulation on the tool holder so as to move the cutting tool relative to the tool holder body and thereby relative to the tool block of the machining apparatus, the imposing means comprising a linear actuator; and
    a mechanical linkage between the tool holder and the tool holder body and operable to decouple the linear actuator from torsional and bending loads applied to the tool holder.

2. A tool holder assembly according to claim 1, wherein the imposing means is operable to move the cutting tool relative to a body being machined with the cutting tool and cause instantaneous and periodic separation between the cutting tool and the body at an intimate region of contact between the cutting tool and the body.

3. A tool holder assembly according to claim 1, wherein the tool holder body is mounted to the tool block so as to have a common axis therewith, the tool holder body rotates about the common axis, and the superimposed sinusoidal modulation imposed by the imposing means comprises movement of the tool along the common axis.

4. A tool holder assembly according to claim 1, wherein the tool holder body is mounted to the tool block so as to have a common axis therewith, and the superimposed sinusoidal modulation imposed by the imposing means comprises movement of the tool parallel to the common axis of the tool holder body and tool block.

5. A tool holder assembly according to claim 1, wherein the linear actuator is chosen from the group consisting of piezomechanical translators, linear drive motor and magnetostrictive actuators.

6. A tool holder assembly according to claim 1, wherein the tool holder comprises a shaft to which the cutting tool is mounted, the shaft is received in a cavity in the tool holder body so that the shaft and the cavity have a common axis, the mechanical linkage is a ball spline bearing for permitting movement between the shaft and the tool holder body parallel to the common axis, and the linear actuator is operable to cause bidirectional actuation of the shaft relative to the tool holder body and parallel to the common axis.

7. A tool holder assembly according to claim 1, wherein the imposing means comprises means for varying and controlling the frequency and the peak-to-peak amplitude of the superimposed sinusoidal modulation.

8. A method of machining a body, the method comprising the steps of:
    mounting a tool holder assembly to a tool block on a machining apparatus, the tool holder assembly comprising a tool holder body secured to the tool block of the machining apparatus, a tool holder mounted on the tool holder body and securing a cutting tool thereto, a linear actuator, and a mechanical linkage between the tool holder and the tool holder body and operable to decouple the linear actuator from torsional and bending loads applied to the tool holder; and
    while machining a body with the cutting tool, imposing with the linear actuator a superimposed sinusoidal modulation on the tool holder so as to move the cutting tool relative to the tool holder body and thereby relative to the tool block of the machining apparatus, the superimposed sinusoidal modulation causing the cutting tool to move relative to the body and causing instantaneous and periodic separation between the cutting tool and the body at an intimate region of contact between the cutting tool and the body.

9. A method according to claim 8, wherein each instantaneous and periodic separation allows a lubricant or cutting fluid to penetrate the intimate region of contact.

10. A method according to claim 8, wherein the tool holder body is mounted to the tool block so as to have a common axis therewith, the tool holder body rotates about the common axis, and the superimposed sinusoidal modulation comprises movement of the tool along the common axis.

11. A method according to claim 8, wherein the tool holder body is mounted to the tool block so as to have a common axis therewith, and the superimposed sinusoidal modulation comprises movement of the tool parallel to the common axis of the tool holder body and tool block.

12. A method according to claim 8, wherein the linear actuator is chosen from the group consisting of piezomechanical translators, linear drive motor and magnetostrictive actuators.

13. A method according to claim 8, wherein the tool holder comprises a shaft to which the cutting tool is mounted, the shaft is received in a cavity in the tool holder body so that the shaft and the cavity have a common axis, the mechanical linkage is a ball spline bearing that is between and permits movement between the shaft and the tool holder body parallel to the common axis, and the shaft is bidirectionally actuated by the linear actuator relative to the tool holder body and parallel to the common axis.

14. A method according to claim 8, wherein each instantaneous and periodic separation produces a chip from the body.

15. A method according to claim 14, further comprising the step of adjusting the superimposed sinusoidal modulation to control the size and shape of the chips.

16. A method according to claim 8, wherein the imposing step applies the superimposed sinusoidal modulation in a tool feed direction and with a peak-to-peak amplitude greater than a feedrate of the cutting tool to cause the instantaneous and periodic separation between the cutting tool and the body, and each instantaneous and periodic separation produces a chip from the body.

17. A method according to claim 8, wherein the imposing step applies the superimposed sinusoidal modulation in a tool feed direction so that an uncut chip thickness equals zero during each cycle of the superimposed sinusoidal modulation, effectively breaking a chip from the body.

18. A method according to claim 8, wherein the cutting tool rotates about an axis of the tool holder body during the machining step.

19. A method of machining a body, the method comprising the steps of:

mounting a tool holder assembly to a tool block on a machining apparatus, the tool holder assembly comprising a tool holder body secured to the tool block of the machining apparatus, a tool holder mounted on the tool holder body and securing a cutting tool thereto; and while machining a body with the cutting tool, imposing a superimposed modulation on the tool holder so as to move the cutting tool relative to the tool holder body and thereby relative to the tool block of the machining apparatus, the superimposed sinusoidal modulation causing the cutting tool to move relative to the body in a direction of cutting velocity and causing instantaneous and periodic separation between the cutting tool and the body at an intimate region of contact between the cutting tool and the body, the product of the frequency and peak-to-peak amplitude of the superimposed sinusoidal modulation exceeding the local tangential velocity of the body to cause the instantaneous and periodic separation between the cutting tool and the body.

20. A method according to claim 19, wherein an instantaneous uncut chip thickness remains constant.

21. A method according to claim 19, wherein each instantaneous and periodic separation allows a lubricant or cutting fluid to penetrate the intimate region of contact.

* * * * *

UNITED STATES PATENT AND TRADEMARK OFFICE
CERTIFICATE OF CORRECTION

PATENT NO.        : 7,587,965 B2                                      Page 1 of 1
APPLICATION NO.   : 11/381513
DATED             : September 15, 2009
INVENTOR(S)       : James B. Mann et al.

It is certified that error appears in the above-identified patent and that said Letters Patent is hereby corrected as shown below:

Column 8, line 60:

[m] is the frequency ...

should be amended to read:

-- $f_m$ -- is the frequency

Signed and Sealed this

Sixteenth Day of November, 2010

David J. Kappos
*Director of the United States Patent and Trademark Office*